United States Patent [19]
Karanian

[11] Patent Number: 5,088,660
[45] Date of Patent: Feb. 18, 1992

[54] BLEED STABILITY DOOR

[75] Inventor: Arthur J. Karanian, Wethersfield, Conn.

[73] Assignee: United Technologies Corporation, Hartford, Conn.

[21] Appl. No.: 649,284

[22] Filed: Jan. 30, 1991

Related U.S. Application Data

[63] Continuation of Ser. No. 389,432, Aug. 4, 1989, abandoned.

[51] Int. Cl.$^5$ .................................................. B64B 1/24
[52] U.S. Cl. .................................... 244/53 B; 137/15.2
[58] Field of Search ........................... 137/15.1, 15.2; 244/53 B, 53 R

[56] References Cited

U.S. PATENT DOCUMENTS

| | | | |
|---|---|---|---|
| 4,250,703 | 2/1981 | Norris et al. | 244/53 B X |
| 4,372,505 | 2/1983 | Syberg | 244/53 B |
| 4,397,431 | 8/1983 | Ben-Porat | 244/53 B |
| 4,620,679 | 11/1986 | Karanian | 244/53 B |

Primary Examiner—Brian S. Steinberger
Attorney, Agent, or Firm—Troxell K. Snyder

[57] ABSTRACT

A supersonic inlet flow duct (10) is provided with a pivoting bleed stability door (34) and biasing spring (42). The door (34) opens under the influence of increased static fluid pressure behind a shock front (24) which is displaced forwardly by a downstream pressure perturbation. The opened door (34) diverts portions (31, 44) of the inlet duct flow stabilizing the shock front (24a) and downstream shock train (25) within the duct (10) until the perturbation subsides.

4 Claims, 2 Drawing Sheets

BLEED STABILITY DOOR

This application is a continuation of Ser. No. 07/389,432, filed on Aug. 4, 1989, and now abandoned.

FIELD OF THE INVENTION

The present invention relates to a supersonic diffuser.

BACKGROUND

Gas turbine engines or ramjets used in supersonic aircraft require a diffusing inlet for reducing the velocity of the air stream below sonic prior to entering the gas turbine compressor or the ramjet combustor.

Typical supersonic inlet duct diffusers are configured within the duct so as to induce a shock train starting at a particular streamwise location within the duct and continuing for one or more duct heights, depending on the duct boundary layer characteristics. As the inlet air stream passes through the shock train, pressure, temperature, and gas density increase dramatically as the fluid decelerates from supersonic to sonic velocity. Such inlet diffusers are well known, as is the common difficulty of stabilizing the location of the shock train within the duct diffuser. Even a small perturbation in gas pressure behind the shock train can push the front upstream causing it to spill out of the inlet, thereby severely reducing mass flow within the duct and increasing drag.

As pressure perturbations are known to occur with such propulsion systems, and as it is desirable to provide as short a diffuser duct length as is practical to efficiently diffuse the inlet flow stream, it is necessary to provide stabilizing means for holding the shock wave train within the inlet diffuser duct despite the inevitable back pressure perturbations. One such means in the prior art is the provision of a perforated bleed vent in the duct wall immediately upstream of the desired shock train location so as to stabilize the position of the shock train within the duct in the event of a back pressure fluctuation.

Such bleed vents in the duct walls immediately upstream of the shock front serve a dual purpose, removing the slower moving boundary layer flow which forms adjacent the wall as the air flows through the first portion of the inlet duct, and venting subsonic air flow from behind the forwardly displaced shock front thereby accommodating displacing back pressure by reducing downstream flow in the duct behind the displaced shock train, and allowing the shock front to move downstream again to the desired streamwise location as the back pressure perturbation subsides.

Such prior art stability configurations are somewhat effective, however it is known that a perforated or bleed wall section having sufficient flow to adequately stabilize the shock wave front under the expected range of back pressure fluctuation can result in a normal bleed flow rate in excess of that required to eliminate the established slow moving boundary layer. Hence the prior art stability bleed diverts too great a portion of the inlet air flow upstream of the shock train during normal operation, reducing overall inlet efficiency It is apparent that the back pressure perturbations in a supersonic diffuser inlet duct result in the need for a variable flow stabilizing bleed or other configuration in order to accommodate the inlet diffuser's variable requirement for stabilizing bleed flow without compromising normal operating efficiency.

SUMMARY OF THE INVENTION

It is therefore an object of the present invention to provide a supersonic diffuser duct which is self stabilizing against loss of flow due to pressure or flow perturbations.

According to the present invention, a supersonic diffusion duct is provided with a hinged stability door in the duct wall adjacent a continuous flow bleed area or vent The stability door, disposed upstream of a throat section in the diffuser, is biased into a closed position by a spring or other urging means during normal diffuser operation. As noted above, during a pressure or other flow variation which forces the front of the shock train upstream from its normal location in the duct throat region, the increased static fluid pressure behind the shock train front is sufficient to open the stability door diverting a greater portion of the flow from the duct, thereby decreasing duct flow downstream of the shock train while maintaining let entrance flow, thus, retaining the shock train inside the duct.

As the perturbation flow condition subsides, the shock wave front retreats back downstream again entering the throat section of the duct and the stability door closes under the influence of the biasing spring or other means, thus returning the duct to a normal, efficient configuration.

It is a particular feature of the present invention to provide a stability door with a hinge oriented transversely with respect to the gas flow and having an upstream extending portion. During stabilizing operation wherein the door is opened by the increased fluid pressure, the additional inertial force of the flow of the gas against the forward extending door portion acts to augment the opening force on the door and, in effect, to stabilize the stabilizer.

It is still further a feature of the present invention to provide the stability door as a portion of an "educated" bleed slot, thereby achieving a wide range of variable bleed flow ratio as the duct accepts subsonic and supersonic flows.

DETAILED DESCRIPTION OF THE INVENTION

Figure 1:
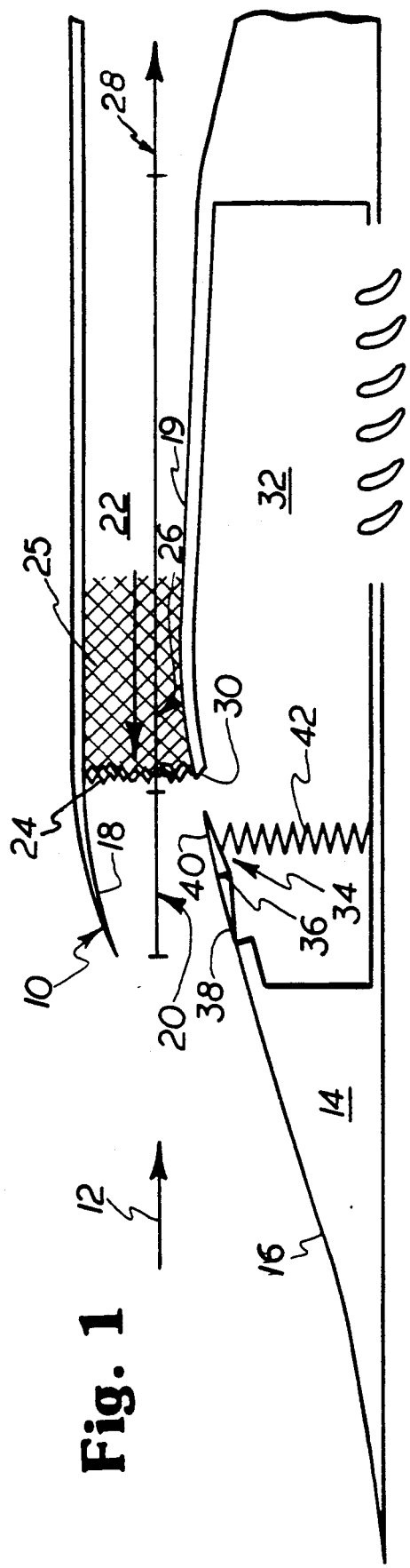
FIG. 1 shows an axial cross section of a supersonic diffuser inlet according to the present invention.

Referring to the drawing figures, FIG. 1 shows a supersonic inlet duct and diffuser 10 receiving a flow of supersonic air 12. The duct 10 includes a center body 14 having a sloping inlet ramp surface 16, and an outer duct wall 18 defining an inlet portion 20 of the duct 22.

The duct 22 is configured so as to diffuse the incoming air flow 12, reducing the speed and recovering the velocity pressure of the flowing air. For supersonic flow, this results in a shock zone or train 25 across which the density, pressure, and temperature of the air stream rise over a length which depends on the characteristics of the duct boundary layer as the gas velocity transitions from supersonic to subsonic. The shock train 25 is preferably maintained within a throat section 26 thereby achieving maximum aerodynamic efficiency and limiting irreversible losses. The downstream section 28 of the duct 22 conducts the subsonic gas flow to the inlet of a gas turbine engine compressor or a ramjet or other propulsion application wherein subsonic inlet air flow is required. As is well known to those skilled in the art, pressure perturbations or other flow disturbances occurring in the downstream, subsonic portion 28 of the duct 22 can push the front 24 of the shock train 25 upstream and out of the throat section 26. As is also well known, such perturbations may even cause the entire shock train 25 to be regurgitated from the duct 22 and greatly reducing the flow in the duct 10.

Stability of the shock train 25 during normal operation may be assisted by providing a bleed slot 30 immediately upstream of the desired shock front location in one of the duct walls 18, 19. In FIG. 1, the bleed slot 30 opens into an internal cavity 32 formed within the centerbody 14 wherein internal pressure equivalent to or somewhat greater than the static pressure of the surrounding air is maintained. The bleed slots 30 vent approximately 2-4% of the mass flow of the air within the duct 22. The air entering the cavity 32 is diverted overboard or used by the aircraft or propulsion system for cooling, etc. The inlet back pressure and bleed flow immediately upstream of the shock front 24 holds the train 25 at the illustrated location during normal duct operation.

For a pressure perturbation which forces the shock train 25 forward into the inlet portion 20 of the duct 22, the present invention provides a self-actuating bleed door 34 pivoting about a central hinge 36 oriented transversely with respect to the incoming air flow 12. The bleed stability door 34 includes a forwardly extending portion 38 and an aftward extending portion 40. The stability door 34 is immediately adjacent the bleed slot 30 as shown.

Figure 2:
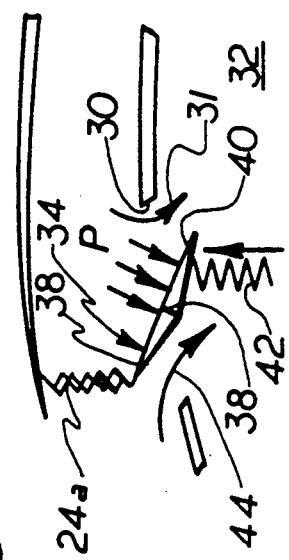
FIG. 2 shows the stability door according to the present invention opened under the influence of the displaced shock train.

During normal operation as shown in FIG. 1, the bleed stability door is closed forming a continuous surface with the duct wall 19 and is held in position by a biasing means such as the illustrated spring 42. Should a downstream pressure perturbation force the shock train 25 forward within the duct 22 and into the inlet portion 20, the bleed stability door 34 according to the present invention opens as shown in FIG. 2 admitting additional air flow through the now expanded bleed slot 30 and creating a second, upstream bleed flow 44. The shock front 24a is retained at the forward edge of the forwardly extending portion 38 of the door 34, the extent of this forward shock front displacement depending on the magnitude of the pressure perturbation, where it remains until the pressure excursion downstream has passed. The flow 31 through this expanded vent opening 30 may be an order of magnitude or greater than the normal bleed slot flow.

Figure 4:
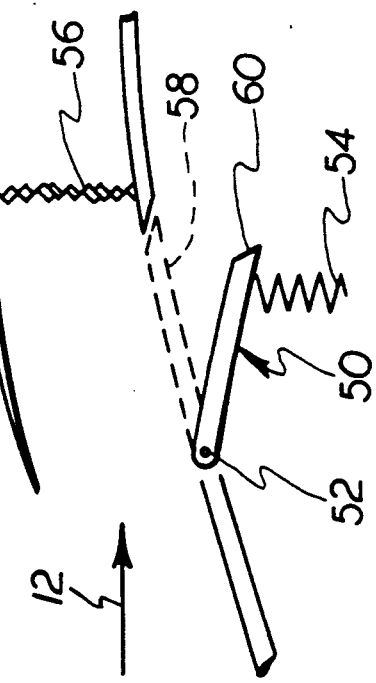
FIG. 4 shows a prior art bleed door.

A feature of the pivoted stability door 34 as shown in FIG. 2 is the quick response time provided by this configuration. As the shock front 24a moves forward across the surface of the door 34, the higher static fluid pressure behind the front 24a exerts an opening force P on the downstream extending portion 40 forcing the door 34 to rotate about the pivot 36 against the biasing spring 42. Unlike the prior art forwardly hinged bleed stability door as shown in FIG. 4, pivoting of the door 34 according to the present invention opens not only the existing bleed slot 30 for additional flow, but also admits the second, upstream flow 44 into the static cavity 32. This immediate increase in overall bleed flow quickly stabilizes the shock front 24a within the inlet zone 20 until such time as the downstream pressure perturbation has declined and the shock train 25 recedes back to the throat section 26 as shown in FIG. 1.

Figure 3:
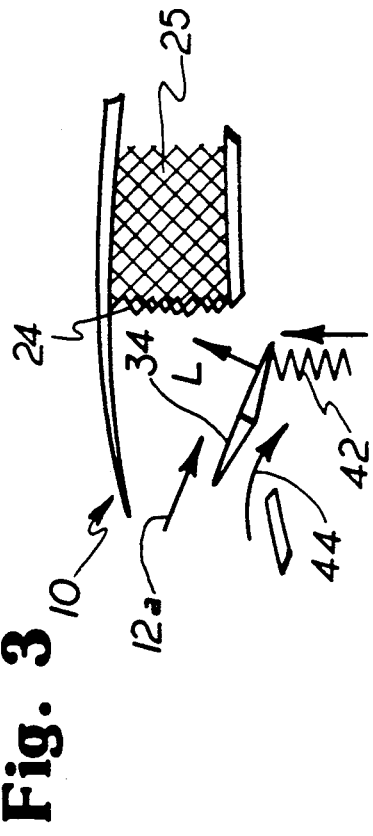
FIG. 3 shows the shock train receded back into the diffuser duct and the stability door closing under the influence of the biasing means.

An advantage of the stability door according to the present invention is the stabilizing effect of the forward flow stream 44 in holding the bleed door open by virtue of the impact pressure on the underside of the forward extending portion 38. This pressure counterbalances the biasing spring 42 thus holding the door 34 in the open position until such time as the shock train 25 has receded back down the duct into the normal position. FIG. 3 shows the receded shock train 25 and the door 34 in the open position. As can be appreciated by viewing FIG. 3, surface pressure forces on the stability door 34 are balanced, thus allowing the biasing spring 42 to drive the door 34 back into the closed position of FIG. 1. Bleed flow through the vent slot 30 is thus restored to the normal rate, and the inlet 10 regains its overall design efficiency.

Another feature of the center hinged bleed stability door 34 is the variability in stabilizing flow which is provided. Depending on the magnitude of the back pressure perturbation in the duct 10 downstream of the shock train 25, the forward displacement of the shock front 24 may only be a small distance, thus imposing a smaller fluid pressure force on the aftward portion 40 of the door 34. The door 34 in this situation is forced to open less than the full travel illustrated in FIG. 2, thus providing an adequate but reduced bleed flow as compared to the maximum flow rate.

FIG. 4 shows a prior art duct 48 having a spring loaded bleed stability door 50 hinged 52 at the upstream edge thereof and including a biasing means 54 such as the spring illustrated. As will be appreciated by those skilled in the art, displacement of the shock wave front 56 in the prior art inlet 48 forward past the bleed door 50 will displace the door from the closed, phantom position 58 into the open, illustrated position 60 thereby increasing bleed flow into the center body interior.

Figure 5:
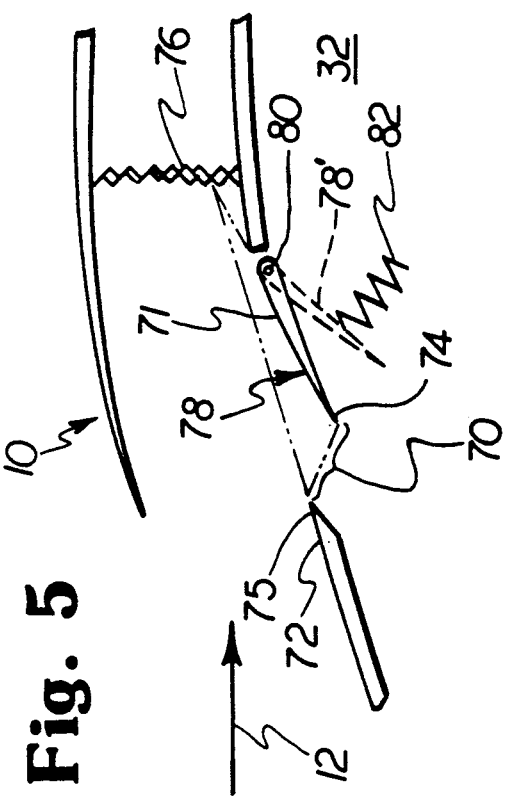
FIG. 5 shows the stability door according to an alternative embodiment of the present invention which provides an educated bleed slot for supersonic duct operation.

FIG. 5 shows an alternative embodiment of the inlet 10 which is configured so as to provide an educated bleed slot 70 during normal operation. The educated bleed slot 70 includes a forward wall 72 and a downstream wall 74 wherein the nominal angle formed between the plane of the downstream surface 71 and the plane of the upstream wall 72 is approximately 9°, and wherein the nominal angle formed between the plane of the upstream wall and the plane defined by the slot edges 74, 75 is approximately 34°. This slot, known to the prior art, is termed "educated" in that the bleed flow therethrough is minimized during supercritical and critical operation. Critical and supercritical operation occurs when the air flow over the bleed region defined by the slot 70 is supersonic. Bleed flow through an educated slot is maximized during periods of subcritical or subsonic flow in the same bleed region. Thus, bleed flow during critical and supercritical inlet operation is low, as may be required for boundary layer bleed, and increases substantially when a pressure perturbation pushes the shock front 76 upstream of this slot 70.

The educated slot bleed stability door according to the present invention is shown in the FIG. 5 embodiment as a hinged door 78 pivoted about a hinge 80 at the downstream edge thereof which is further oriented transversely with respect to the incoming gas flow 12. The door 78 includes a biasing means or spring 82 for urging the door into the closed position. Should the shock wave front 76 be displaced forward as discussed above, the increased pressure on the duct surface 71 of the door 78 forces the door downward into the lower pressure cavity 32 thereby opening the bleed slot 70 and increasing the proportion of bleed flow. As with the embodiment shown in FIG. 1, the velocity pressure of the diverted air striking the duct facing surface 71 of the door 78 further urges the door into the open position illustrated in phantom 78' in FIG. 5. The coupling of the velocity pressure and static pressure in forcing the door 78 to open as the shock front 76 is displaced forwardly, enhances the response time and maximum flow rate of inlets equipped with educated bleed doors. Although disclosed and described herein with reference to the accompanying Figures, it must be appreciated that a variety of alternative and equivalent embodiments of the present invention may be made without departing from the scope thereof. For example, an educated bleed slot may be provided adjacent the center pivoted stability door 34, combining the stability and flow characteristics of both structures to increase overall inlet stability. The foregoing description is hence illustrative and not limiting, with the invention being defined solely by the claims appended hereinbelow.

I claim:

1. In a supersonic diffuser duct receiving a flow of gas at supersonic velocity and diffusing said gas flow across a sonic shock train disposed in a throat section of the duct, the improvement comprising:

surface pressure actuated means for preventing uncontrolled upstream movement of the shock train from within a preselected, streamwise displacement range, including a bleed opening disposed in the duct wall, the bleed opening continuously venting a portion of the gas flow from the duct immediately upstream of the streamwise displacement range, a hinged door, disposed adjacent the bleed opening and forming a portion of the duct wall upstream of the bleed opening, including a supporting hinge oriented transversely with respect to the gas flow, the door further including a surface extending upstream of the supporting hinge and forming a portion of the duct wall, wherein the door is pivotable about the hinge between a normal, closed position in which the door cooperates with the remainder of the duct wall to confine the gas therewithin, and at least one open position wherein an additional portion of the gas flow is vented, and means for biasing the hinged door in the closed position, said biasing means adapted to yield under static pressure at the door surface at a pressure level higher than a preselected wall pressure.

2. The diffuser duct as recited in claim 1 wherein the continual bleed flow through the bleed opening is in the range of approximately 2-4% of the mass of the total flow entering the duct.

3. The diffuser duct as recited in claim 1 wherein the door includes a downstream extending portion with respect to the hinge.

4. The duct as recited in claim 1 wherein the door forms the downstream lip of an educated bleed slot.

* * * * *